(12) United States Patent
Mont-Reynaud et al.

(10) Patent No.: US 9,390,167 B2
(45) Date of Patent: Jul. 12, 2016

(54) SYSTEM AND METHODS FOR CONTINUOUS AUDIO MATCHING

(75) Inventors: Bernard Mont-Reynaud, Sunnyvale, CA (US); Aaron Master, Palo Alto, CA (US); Timothy P. Stonehocker, Sunnyvale, CA (US); Keyvan Mohajer, Los Gatos, CA (US)

(73) Assignee: SoundHound, Inc., Santa Clara, CA (US)

( * ) Notice: Subject to any disclaimer, the term of this patent is extended or adjusted under 35 U.S.C. 154(b) by 556 days.

(21) Appl. No.: 13/193,514

(22) Filed: Jul. 28, 2011

(65) Prior Publication Data

US 2012/0029670 A1    Feb. 2, 2012

Related U.S. Application Data (60) Provisional application No. 61/368,735, filed on Jul. 29, 2010.

(51) Int. Cl.
*G06F 17/00* (2006.01)
*G06F 17/30* (2006.01)

(52) U.S. Cl.
CPC .... *G06F 17/30743* (2013.01); *G06F 17/30026* (2013.01)

(58) Field of Classification Search
None
See application file for complete search history.

(56) References Cited

U.S. PATENT DOCUMENTS

| | | | |
|---|---|---|---|
| 3,919,479 A | 11/1975 | Moon et al. | |
| 4,450,531 A | 5/1984 | Kenyon et al. | |
| 4,697,209 A | 9/1987 | Kiewit et al. | |
| 4,739,398 A | 4/1988 | Thomas et al. | |
| 4,843,562 A | 6/1989 | Kenyon et al. | |
| 4,918,730 A | 4/1990 | Schulze | |
| 4,928,249 A | 5/1990 | Vermesse | |
| 4,959,850 A | 9/1990 | Marui | |
| 5,019,899 A | 5/1991 | Boles et al. | |
| 5,164,915 A | 11/1992 | Blyth | |
| 5,436,653 A | 7/1995 | Ellis et al. | |
| 5,437,050 A | 7/1995 | Lamb et al. | |

(Continued)

FOREIGN PATENT DOCUMENTS

| | | |
|---|---|---|
| EP | 0944033 A1 | 9/1999 |
| EP | 1367590 A2 | 12/2003 |

(Continued)

OTHER PUBLICATIONS

International Search Report, appl. No. PCT/2009/066458, mailed Jun. 23, 2010.

(Continued)

*Primary Examiner* — Fan Tsang
*Assistant Examiner* — David Siegel
(74) *Attorney, Agent, or Firm* — Haynes Beffel & Wolfeld LLP; Ernest J. Beffel, Jr.

(57) ABSTRACT

The present invention relates to the continuous monitoring of an audio signal and identification of audio items within an audio signal. The technology disclosed utilizes predictive caching of fingerprints to improve efficiency. Fingerprints are cached for tracking an audio signal with known alignment and for watching an audio signal without known alignment, based on already identified fingerprints extracted from the audio signal. Software running on a smart phone or other battery-powered device cooperates with software running on an audio identification server.

30 Claims, 4 Drawing Sheets

(56) References Cited

U.S. PATENT DOCUMENTS

| | | |
|---|---|---|
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,664,270 A | 9/1997 | Bell et al. |
| 5,687,279 A | 11/1997 | Matthews |
| 5,708,477 A | 1/1998 | Forbes et al. |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,969,283 A | 10/1999 | Looney et al. |
| 5,974,409 A | 10/1999 | Sanu et al. |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,108,626 A | 8/2000 | Cellario et al. |
| 6,121,530 A | 9/2000 | Sonoda |
| 6,122,403 A | 9/2000 | Rhoads |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,292,767 B1 | 9/2001 | Jackson et al. |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,504,089 B1 | 1/2003 | Negishi et al. |
| 6,505,160 B1 | 1/2003 | Levy et al. |
| 6,507,727 B1 | 1/2003 | Henrick |
| 6,510,325 B1 | 1/2003 | Mack, II et al. |
| 6,519,564 B1 | 2/2003 | Hoffberg et al. |
| 6,535,849 B1 | 3/2003 | Pakhomov et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,629,066 B1 | 9/2003 | Jackson et al. |
| 6,631,346 B1 | 10/2003 | Karaorman et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,834,308 B1 | 12/2004 | Ikezoye et al. |
| 6,850,288 B2 | 2/2005 | Kurokawa |
| 6,879,950 B1 | 4/2005 | Mackie et al. |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 7,017,208 B2 | 3/2006 | Weismiller et al. |
| 7,058,376 B2 | 6/2006 | Logan et al. |
| 7,085,716 B1 | 8/2006 | Even et al. |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,672,916 B2 | 3/2010 | Poliner et al. |
| 7,693,720 B2 | 4/2010 | Kennewick et al. |
| 7,743,092 B2 | 6/2010 | Wood |
| 7,756,874 B2 | 7/2010 | Hoekman et al. |
| 7,783,489 B2 | 8/2010 | Kenyon et al. |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,904,297 B2 | 3/2011 | Mirkovic et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,116,746 B2 | 2/2012 | Lu et al. |
| 8,296,179 B1 | 10/2012 | Rennison |
| 8,358,966 B2 | 1/2013 | Zito et al. |
| 8,433,431 B1 | 4/2013 | Master et al. |
| 8,452,586 B2 | 5/2013 | Master et al. |
| 8,694,537 B2 | 4/2014 | Mohajer |
| 8,762,156 B2 | 6/2014 | Chen |
| 9,047,371 B2 | 6/2015 | Mohajer et al. |
| 2001/0005823 A1 | 6/2001 | Fischer et al. |
| 2001/0014891 A1 | 8/2001 | Hoffert et al. |
| 2001/0053974 A1 | 12/2001 | Lucke et al. |
| 2002/0023020 A1 | 2/2002 | Kenyon et al. |
| 2002/0042707 A1 | 4/2002 | Zhao et al. |
| 2002/0049037 A1 | 4/2002 | Christensen et al. |
| 2002/0072982 A1 | 6/2002 | Barton et al. |
| 2002/0083060 A1 | 6/2002 | Wang et al. |
| 2002/0138630 A1 | 9/2002 | Solomon et al. |
| 2002/0163533 A1 | 11/2002 | Trovato et al. |
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198713 A1 | 12/2002 | Franz et al. |
| 2002/0198789 A1 | 12/2002 | Waldman |
| 2003/0023437 A1 | 1/2003 | Fung |
| 2003/0050784 A1 | 3/2003 | Hoffberg et al. |
| 2003/0078928 A1 | 4/2003 | Dorosario et al. |
| 2003/0106413 A1 | 6/2003 | Samadani et al. |
| 2003/0192424 A1 | 10/2003 | Koike |
| 2004/0002858 A1 | 1/2004 | Attias et al. |
| 2004/0019497 A1 | 1/2004 | Volk et al. |
| 2004/0143349 A1* | 7/2004 | Roberts et al. ................. 700/94 |
| 2004/0167779 A1 | 8/2004 | Lucke et al. |
| 2004/0193420 A1 | 9/2004 | Kennewick et al. |
| 2004/0231498 A1 | 11/2004 | Li et al. |
| 2005/0016360 A1 | 1/2005 | Zhang |
| 2005/0016361 A1 | 1/2005 | Ikeya et al. |
| 2005/0027699 A1 | 2/2005 | Awadallah et al. |
| 2005/0086059 A1 | 4/2005 | Bennett |
| 2005/0254366 A1 | 11/2005 | Amar |
| 2005/0273326 A1 | 12/2005 | Padhi et al. |
| 2006/0059225 A1 | 3/2006 | Stonehocker et al. |
| 2006/0106867 A1* | 5/2006 | Burges ............. G06F 17/30026 |
| 2006/0122839 A1 | 6/2006 | Li-Chun Wang et al. |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0242017 A1 | 10/2006 | Libes et al. |
| 2006/0277052 A1 | 12/2006 | He et al. |
| 2007/0010195 A1 | 1/2007 | Brown et al. |
| 2007/0016404 A1 | 1/2007 | Kim et al. |
| 2007/0055500 A1 | 3/2007 | Bilobrov |
| 2007/0120689 A1 | 5/2007 | Zerhusen et al. |
| 2007/0168409 A1 | 7/2007 | Cheung |
| 2007/0168413 A1 | 7/2007 | Barletta et al. |
| 2007/0204319 A1 | 8/2007 | Ahmad et al. |
| 2007/0239676 A1 | 10/2007 | Stonehocker et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0082510 A1 | 4/2008 | Wang et al. |

(56) References Cited

U.S. PATENT DOCUMENTS

| | | | |
|---|---|---|---|
| 2008/0134264 | A1 | 6/2008 | Narendra et al. |
| 2008/0154951 | A1 | 6/2008 | Martinez et al. |
| 2008/0208891 | A1 | 8/2008 | Wang et al. |
| 2008/0215319 | A1 | 9/2008 | Lu et al. |
| 2008/0235872 | A1 | 10/2008 | Newkirk et al. |
| 2008/0249982 | A1 | 10/2008 | Lakowske |
| 2008/0255937 | A1 | 10/2008 | Chang et al. |
| 2008/0256115 | A1* | 10/2008 | Beletski et al. ............... 707/102 |
| 2009/0030686 | A1 | 1/2009 | Weng et al. |
| 2009/0031882 | A1 | 2/2009 | Kemp et al. |
| 2009/0037382 | A1* | 2/2009 | Ansari et al. ....................... 707/3 |
| 2009/0063147 | A1 | 3/2009 | Roy |
| 2009/0064029 | A1 | 3/2009 | Corkran et al. |
| 2009/0119097 | A1 | 5/2009 | Master et al. |
| 2009/0125298 | A1 | 5/2009 | Master et al. |
| 2009/0125301 | A1 | 5/2009 | Master et al. |
| 2009/0165634 | A1 | 7/2009 | Mahowald |
| 2009/0228799 | A1 | 9/2009 | Verbeeck et al. |
| 2009/0240488 | A1 | 9/2009 | White et al. |
| 2010/0014828 | A1 | 1/2010 | Sandstrom et al. |
| 2010/0049514 | A1 | 2/2010 | Kennewick et al. |
| 2010/0205166 | A1 | 8/2010 | Boulter et al. |
| 2010/0211693 | A1 | 8/2010 | Master et al. |
| 2010/0235341 | A1 | 9/2010 | Bennett |
| 2010/0241418 | A1 | 9/2010 | Maeda et al. |
| 2010/0250497 | A1 | 9/2010 | Redlich et al. |
| 2011/0046951 | A1 | 2/2011 | Suendermann et al. |
| 2011/0071819 | A1 | 3/2011 | Miller et al. |
| 2011/0082688 | A1 | 4/2011 | Kim et al. |
| 2011/0132173 | A1 | 6/2011 | Shishido |
| 2011/0132174 | A1 | 6/2011 | Shishido |
| 2011/0173208 | A1* | 7/2011 | Vogel ............................ 707/746 |
| 2011/0213475 | A1 | 9/2011 | Herberger et al. |
| 2011/0244784 | A1 | 10/2011 | Wang |
| 2011/0276334 | A1 | 11/2011 | Wang et al. |
| 2011/0288855 | A1 | 11/2011 | Roy |
| 2012/0029670 | A1 | 2/2012 | Mont-Reynaud et al. |
| 2012/0078894 | A1* | 3/2012 | Jiang et al. .................... 707/723 |
| 2012/0232683 | A1 | 9/2012 | Master et al. |
| 2013/0052939 | A1 | 2/2013 | Anniballi et al. |
| 2014/0019483 | A1 | 1/2014 | Mohajer |
| 2014/0316785 | A1 | 10/2014 | Bennett et al. |

FOREIGN PATENT DOCUMENTS

| | | |
|---|---|---|
| JP | H11-272274 A | 10/1999 |
| JP | 2000187671 A | 7/2000 |
| WO | 9517746 A1 | 6/1995 |
| WO | 99/18518 A2 | 4/1999 |
| WO | 03061285 A2 | 7/2003 |
| WO | 2004091307 A2 | 10/2004 |
| WO | 2008004181 A2 | 1/2008 |
| WO | 2010018586 A2 | 2/2010 |
| WO | 2013177213 A2 | 11/2013 |

OTHER PUBLICATIONS

InData Corporation, DepoView Video Review Software Product Description, "InData's Newest Video Deposition Viewer", Dec. 2007, 2 pgs.

InData Corporation, DepoView DVD, Video Review Software Product Brochure, Jun. 2008, 4 Pgs.

InData Corporation, DepoView Video Review Software Product Description, http://indatacorp.com/depoview.html, accessed Nov. 8, 2011, 2 Pgs.

Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.

Blackburn, Steven G. "Content Based Retrieval and Navigation of Music". University of Southampton, Departmenf of Electronics and Computer Science, Faculty of Engineering and Applied Science. Mar. 10, 1999. 41 Pages.

Blackburn, Steven, et al. "A Tool for Content Based Navigation of Music". University of Southampton, Department of Electronics and Computer Science, Multimedia Research Group. Copyright 1998 ACM 1-58113-036-8/98/0008. pp. 361-368.

Blackburn, Steven George. "Content Based Retrieval and Navigation of Music Using Melodic Pitch Contours". University of Southampton, Department of Electronics and Computer Science, Faculty of Engineering and Applied Science. Sep. 26, 2000. 136 Pages.

Blackburn, Steven G. "Search by Humming". University of Southampton, Department of Electronics and Computer Science, Faculty of Engineering. May 8, 1997. 69 Pages.

Hum That Tune, Then Find it on the Web. NPR: Weekend Edition—Saturday, WKSA. Copyright 2006 National Public Radio. Dec. 23, 2006. Factiva, Inc. 2 pages.

Casey, Michael A., et al., "Content-Based Music Information Retrieval: Current Directions and Future Challenges". Apr. 2008 vol. 96, No. 4. Copyright 2008 IEEE. Retrieved from IEEE Xplore [retrieved on Dec. 29, 2008 at 18:02]. 29 Pages.

Wagstaff, Jeremy. "Loose Wire: New Service Identifies Songs You Hum". WSJA Weekend Journal. Copyright 2006, Dow Jones & Company, Inc. Dec. 25, 2006. Factiva, Inc. 2 pages.

Saltzman, Marc. "The Best Things in life are Free—For Your iPhone". Home Electronics and Teechnology, For Canwest News Service. Copyright 2008 Edmonton Journal. Nov. 12, 2008. Factiva, Inc. 2 pages.

First Products with Gracenote Technology to Ship in 2008. Warren's Consumer Electronics Daily. Copyright 2007 Warren Publishing, Inc. Sep. 18, 2007. Factiva, Inc. 2 pages.

Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.

Furui, Sadaoki. "Digital Speech Processing, Synthesis, and Recognition". Second Edition, Revised and Expanded. Nov. 17, 2000. ISBN 978-0824704520. 17 pages.

Ghias, Asif, et al. "Query by Humming". Musical Information Retrieval in an Audio Database. Cornell University 1995. 6 Pages.

Ghias, Asif, et al. "Query by Humming—Musical Information Retrieval in an Audio Database". ACM Multimedia 95—Electronic Proceedings. San Francisco, Ca. Nov. 5-9, 1995. 13 Pages.

Han, Byeong-jun, et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.

Jang, Jyh-Shing Roger, et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.

Kosugi, Naoko, et al. "A Practical Query-By-Humming System for a Large Music Database". NTT Laboratories, Japan. ACM Multimedia Los Angeles, Ca, USA. Copyright ACM 2000 1-58113-198-4/00/10. pp. 333-342. 10 Pages.

McNab, Rodger J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p. 11-18. 8 Pages.

McNab, Rodger J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/may97/meldex/05written.html>, 13 pages.

Pardo, Bryan, et al. "The VocalSearch Music Search Engine". EECS, Northwestern University. JCDL 2008, Pittsburgh, Pennsylvania, USA. Jun. 16-20, 2008, ACM 978-1-59593-998-2/08/06. p. 430. 1 Page.

Mobile Music: Comcast Cellular First in U.S. To Trial Breakthrough Interactive Music Service Called *CD. Copyright PR Newswire, New York. ProQuest LLC. Feb. 11, 1999. Retrieved from the Internet: <http://proquest.umi.com.libproxy.mit.edu/pqdwb?did+38884944 &sid=3&Fmt=3&clientId=5482&RQT=309&VName=PQD>. 3 pages.

Song, Jungmin, et al. "Query by Humming: Matching Humming Query to Polyphonic Audio". LG Electronics, Seoul, Korea. Copyright 2002 IEEE. 0-7809-7304-9/02. pp. 329-332. 4 Pages.

(56) References Cited

OTHER PUBLICATIONS

Taylor, Chuck. "Company Lets Listeners Dial for CDs". Billboard, vol. 1, No. 26, General Interest Module. Jun. 26, 1999. pp. 86-87. 2 pages.
Can't Get That Song Out of Your Head. Copyright 2007 The Jakarta Post. May 20, 2007. Factiva, Inc. 2 Pages.
Typke, Rainer, et al. "A Survey of Music Information Retrieval Systems". Universiteit Utrecht, The Netherlands. Copyright 2005 Queen Mary, University of London. 8 Pages.
Wang, Avery. "The Shazam Music Recognition Service". Communications of the ACM, vol. 49, No. 8. Aug. 2006. ACM 0001-0782/06/0800. pp. 44-48. 5 pages.
Melodis Rolls Out midomi mobile. Wireless News. Copyright 2008 M2 Communications, Ltd. Mar. 6, 2008. 1 Page.
Zhu, Yunyue, et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.
International Preliminary Report on Patentability dated Jun. 7, 2011 for Application No. PCT/US2009/066458.
Wang et al., "Method and Apparatus for Recognizing Sound and Music Signals in High Noise and Distortion", U.S. Appl. No. 60/222,023, dated Jul. 31, 2000, 26 pages.
Rhoads, G., "Methods and Systems Employing Digital Watermarking", U.S. Appl. No. 60/134,782, dated May 19, 1999, 47 pages.
Finley, Michael, et al., "Broadcast Media Purchasing System", U.S. Appl. No. 60/166,965, dated Nov. 23, 1999, 21 pages.
Swierczek, Remi, "Music Identification System", U.S. Appl. No. 60/158,087 dated Oct. 7, 1999, 12 pages.
Swierczek, Remi, "Music Identification System", U.S. Appl. No. 60/186,565, dated Mar. 2, 2000, 14 pages.
Chou, Ta-Chun, et al., "Music Databases: Indexing Techniques and Implementation", Proceedings of International Workshop on Multimedia Database Management Systems, IEEE, dated Aug. 14-16, 1996, pp. 46-53, 8 pages.
McPherson, John R. and Bainbridge, David, "Usage of the MELDEX Digital Music Library", 1999, in Proceedings of the International Symposium on Music Information Retrieval, (Bloomington, IN, USA, 2001), pp. 19-20, 2 pages.
Wold, Erling, et al., "Classification, Search, and Retrieval of Audio", Muslce Fish, Berkeley, CA, USA, CRC Handbook of Multimedia Computing 1999, pp. 1-19, 18 pages.
Wold et al., "Content-Based Classification, Search and Retrieval of Audio", IEEE Multimedia 1070-986X/96, vol. 3, No. 3: Fall 1996, pp. 27-36 (17 pages).
Horn, Patricia, "What was that song? With a wireless phone, find out what you heard on the radio.", The Inquirer, Philadelphia, Pennsylvania, USA, dated Feb. 11, 1999, 3 pages.
Kenyon, Stephen, et al., U.S. Appl. No. 60/218,824 for Audio Identification System and Method, Jul. 18, 2000, 45 pages.
Kenyon, Stephen, U.S. Appl. No. 60/155,064 for Automatic Program Identification System and Method, Sep. 21, 1999, 49 pages
U.S. Appl. No. 13/401,728—Response to Office Action dated Jul. 17, 2014, filed Oct. 16, 2014, 16 pages.
U.S. Appl. No. 13/401,728—Notice of Allowance dated Mar. 4, 2015, 8 pages.
U.S. Appl. No. 13/401,728—Office Action dated Jul. 17, 2014, 11 pages.
StagePrompt Pro (formerly Music Scroller), <http://www.softpedia.com/get/Multimedia/Audio/Other-AUDIO-Tools/StagePrompt-Pro.shtml> last accessed Sep. 10, 2015, 2 pages.
U.S. Appl. No. 13/310,630—Office Action dated Apr. 7, 2014, 14 pages.
U.S. Appl. No. 13/310,630—Office Action dated Nov. 19, 2014, 22 pages.
U.S. Appl. No. 13/310,630—Office Action dated Jun. 19, 2015, 24 pages.
U.S. Appl. No. 13/310,630—Office Action dated Nov. 2, 2015, 12 pages.
U.S. Appl. No. 13/372,399—Office Action dated May 18, 2012, 16 pages.
U.S. Appl. No. 13/372,399—Office Action dated Sep. 25, 2012, 18 pages.
U.S. Appl. No. 12/629,821—Office Action dated May 31, 2012, 10 pages.
U.S. Appl. No. 13/372,381—Office Action dated May 15, 2014, 15 pages.
U.S. Appl. No. 13/372,381—Office Action dated Nov. 5, 2014, 23 pages.

* cited by examiner

Fig. 4

SYSTEM AND METHODS FOR CONTINUOUS AUDIO MATCHING

CROSS-REFERENCE TO RELATED APPLICATIONS

This application claims the benefit of U.S. Provisional Application No. 61/368,735, entitled "Systems and Methods for Continuous Audio Matching" filed 29 Jul. 2010, which is incorporated by reference herein.

BACKGROUND OF THE INVENTION

1. Field of the Invention

The present invention relates generally to audio signal processing, and more particularly to identification of audio items such as songs within an audio signal.

2. Description of Related Art

An audio identification system takes as input a short audio segment, typically a few seconds in length, and finds a match within a specific recording (e.g. a song, or other audio item) in a database of audio items. Internally, the system extracts from the input audio certain feature sequences that are well suited for the audio matching task. Such sequences are used to search a database of known audio items, looking for a best match. The item that best matches the audio input is returned, or it is determined that a good match does not exist.

Popular systems, such as those available from Sound-Hound and Shazam allow a user to push a button on their smart phone to start capturing an audio segment and have the system automatically identify a recording that matches the captured audio, and a position within such a recording. The captured audio segment is transmitted over a network to a remote audio identification server. The server attempts to identify the audio item from the segment, and transmits audio identification information back to the device.

Audio identification can be resource intensive for a battery-powered, portable device. The processing and transmission by the device both consume precious battery power. In addition, transmission of large amounts of data during the identification process can be expensive for the user. Finally, the computational load of the servers that perform database look-ups is another significant cost factor.

It is therefore useful to provide improved systems and methods for identifying audio items.

SUMMARY OF THE INVENTION

One aspect of technology described herein includes using a battery powered device to continuously monitor an audio signal and identify audio items within the audio signal. The audio item may be for example be a song, audio from various published media sources, such as sound tracks for movie trailers or the movies themselves, or the audio for commercials (ads).

The technology includes predictively caching of audio fingerprint sequences and corresponding audio item identifiers from a server after the device sends initial audio fingerprints extracted from the audio signal by the device. A tracking cache and a watching cache described herein are collectively referred to as "predictive cache(s)", because the fingerprint or audio feature sequences are predicted to follow received segment data of the audio signal that has been at least partially recognized. The technology also includes using the predictively cached audio fingerprint sequences to identify an audio item within the audio signal based on at least some additional audio fingerprints of the audio signal.

Another aspect of technology described herein includes efficiently using a battery powered device to continuously monitor an audio signal and identify audio items within the audio signal. The technology includes receiving into a local cache on the device predictive audio fingerprints and corresponding audio item identifiers appropriate to a watching mode and a tracking mode as the device switches between the watching and tracking modes. The technology also includes switching between the watching mode in which a transition has occurred between a known audio item and a new unknown audio item, and the tracking mode in which a plurality of candidates for a current audio item have been identified, but not resolved to a single current audio item.

Another aspect of technology described herein includes managing resources in a server to continuously monitor an audio signal and identify audio items within the audio signal. The technology includes receiving into a local cache on the server predictive audio fingerprints and corresponding audio item identifiers appropriate to a watching mode and a tracking mode as the server switches between the watching and tracking modes. The technology includes switching between the watching mode in which a transition has occurred between a known audio item and a new unknown audio item, and the tracking mode in which a plurality of candidates for a current audio item have been identified, but not resolved to a single current audio item.

Particular aspects of the present invention can be seen on review of the drawings, the detailed description, and the claims which follow.

DETAILED DESCRIPTION

Systems and methods are described herein for continuous monitoring of an audio signal and identification of audio items within an audio signal. The technology disclosed utilizes predictive caching of fingerprints to improve efficiency. Fingerprints are cached for tracking an audio signal with known alignment and for watching an audio signal without known alignment, based on already identified fingerprints extracted from the audio signal. Software running on a smart phone or other battery-powered device cooperates with software running on an audio identification server.

At times, passive access to audio item identification will be preferable to an explicit user initiated search, and continuous monitoring is desired. An intelligent, fully automated audio matching system can operate on a continuing basis, and be able to create an entirely different user experience. The various costs found in segment-based identification systems can be even greater when the system is in continuous use.

Figure 1:
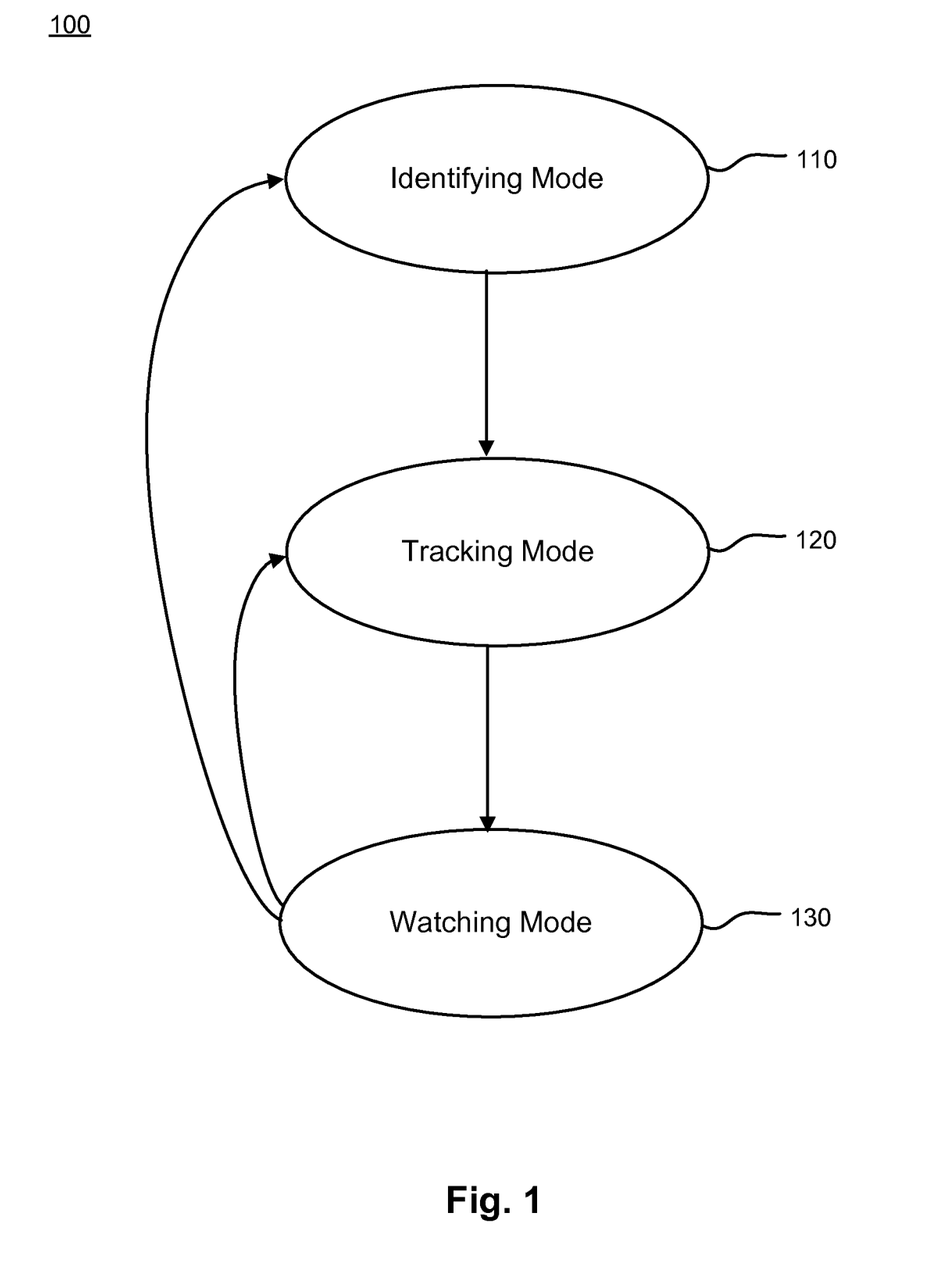
FIG. 1 is an exemplary high-level state diagram of a system suitable to continuously monitor and identify audio items from a continuous audio monitoring signal.

FIG. 1 is an exemplary high-level state diagram 100 of a system suitable to continuously monitor and identify audio items from a continuous audio monitoring signal. The diagram 100 shows that the audio identification process alternates among an identifying mode 110, a tracking mode 120 and a watching mode 130. The identifying mode 110 is a starting point for an unknown audio item. The overall process can include analyzing a segment, identifying an audio item or multiple candidate audio items, predicatively caching fingerprints or audio features to be used in a tracking 120 and a watching 130 mode, and proceeding with the tracking mode 120 and watching 130.

The tracking and watching modes 120, 130 both rely on cached fingerprints. They differ in that the tracking mode 120 relies on a known or suspected alignment between reference fingerprints and extracted fingerprints from the segment, whereas the watching mode 130 does not require alignment. The system tracks from a known fingerprint to expected successive fingerprint(s), using a known or suspected alignment. For instance, from a segment of the chorus of a song, there may be several alternative fingerprints for different verses that follow the chorus. For different mixes of the same song by a particular artist, an extended sequence of fingerprints may be needed to distinguish the sampled audio item from very similar audio items.

Tracking mode 120 recognizes when the audio input transitions away from a known audio item, such as at the end of the song or when the user skips or fast forwards. Tracking mode 120 transitions to watching mode 130, which involves local recognition of fingerprints or audio features using a cached database that has been predictably cached based on previously recognized audio item(s), without depending on an alignment. For instance, if two recently identified audio items are from the same CD, it might be expected that the next audio item will also be from that CD.

The watching mode 130 may successfully identify an audio item from cached fingerprints or audio features, or it may fail. When the watching mode 130 fails, because the cached database does not include the extracted features or fingerprints from the current segment, the system reverts to the identifying mode 110. When the watching mode 130 succeeds, the tracking mode 120 resumes. At various times during the tracking mode 120 and the watching mode 130, the predictive cache may be updated with additional fingerprints or audio features. This may occur, for instance, when the watching mode 130 succeeds.

Before explaining the operation of the system in more detail, it may be useful to define some terms that will be used repeatedly in this disclosure.

DEFINITIONS

A catalog is a database that associates stored audio items or features of audio items with corresponding audio items identifiers, called meta-data or labels. The terms reference, audio item or item refer to catalog entries. Catalogs can vary in the type of content they hold, based on the needs of different applications, according to the lifespan of their items, then by content type.

Permanent catalogs expand over time. Once entered, items usually remain in the catalog, though some items may be eventually phased out. Long shelf life items include music titles (published songs); audio from various published media sources, such as sound tracks (in various languages) for movie trailers or the movies themselves; the audio for commercials (ads); and any meaningfully labeled audio segments of interest. When a business sells or licenses music or audio-visual titles, audio indexing can be used to automatically associate audio content with their site or products. In such a case, they cooperate, and supply meta-data to facilitate access to their titles.

Transient catalogs are a collection of audio items with a shorter shelf life. Time-sensitive audio items can come from broadcast sources, including radio, TV or cable stations, the content of which was labeled, possibly by the automated use of meta-data transmitted along with the audio/visual (A/V) content. Items in a transient catalog have life spans of months or weeks (for ads) to days or hours (for tracking of VCR replays).

Real-time catalogs contain the most recent audio segments from specific broadcast sources. These may not be delimited segments with a fixed beginning or end, but dynamically defined segments that represent a moving time window into real-time streams of interest. Such segments may be weakly labeled by broadcast source; in most cases, more specific labels exist as well. These are like the labels in static catalogs, but they change over time. An example of this is to store the last N seconds of audio from the radio stations in a given region, and to derive information about the ongoing program from the meta-data that is broadcast along with the media. A rotating audio buffer is kept for each station; both the audio content and specific labels will be in flux, with life spans which may be for example on the order of seconds to minutes.

A delimited query is a segment of audio signal that is sampled by a device such as a smart phone or other battery-powered, portable device. A delimited query has a specific beginning and end. The segment may be captured with a microphone or provided directly from a decoder. The segment may be captured using for example a cell phone or tablet, a portable computer, music player, or desktop computer. A client device has a unique client ID, which is used in communications with a continuous audio identification server.

The delimited query is typically labeled using the unique client ID and a time stamp. The audio signal may be compressed, via a codec, a feature extractor, a fingerprint extractor or alternative mechanism, before it is transmitted via a network to the audio identification server.

A "fingerprint" is a representation generated from an audio segment and used to match audio items in a catalog. Various techniques can be used to generate and match fingerprints. One approach is to construct a time-frequency energy representation (a spectrogram for the audio signal) with time and frequency resolutions sufficient to show perceptually salient, noise robust yet distinctive patterns. In such a case, fingerprints are spectrograms, and they are built for audio segments and for reference audio items in the same manner. The distance (or dissimilarity measure) between the fingerprint of the captured audio and that of an aligned portion of the audio item may for example be computed in two steps: (1) define a spectral distance measure (spectral error); and (2) adding these frame-by-frame errors along the entire captured segment. Optionally, time and space can be saved by encoding each frame (spectral slice) into a smaller code, which amounts to a noise-robust characterization of the spectral shape of the frame, and define a code-to-code similarity measure. Alternatively, other techniques may be used that not treat the captured audio and reference audio symmetrically.

Submodes

Figure 2:
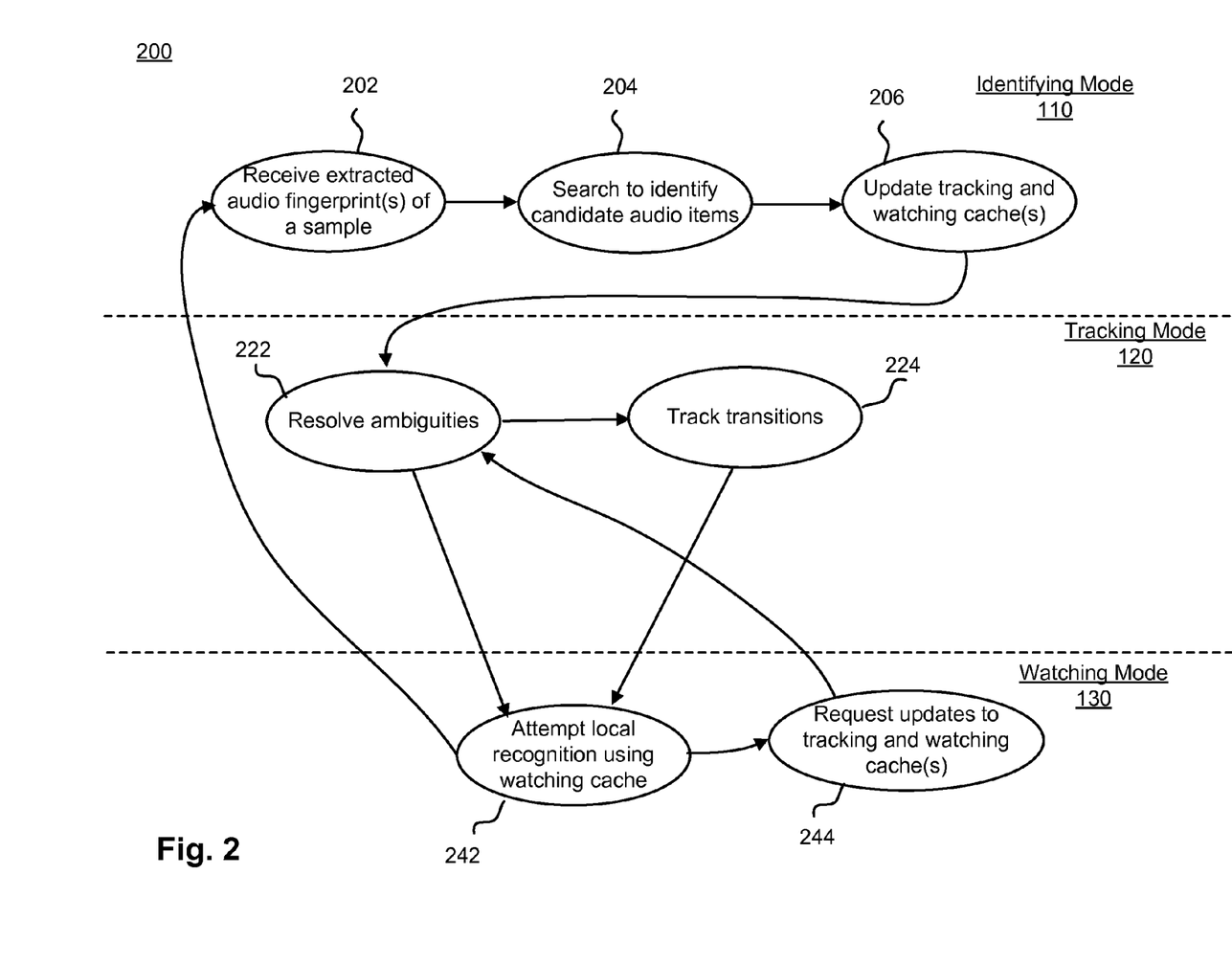
FIG. 2 is a submode diagram that provides more detail of the identifying, tracking and watching modes.

FIG. 2 is a submode diagram 200 that provides more detail of the identifying, tracking and watching modes 110, 120, 130. The identifying mode 110 is a novel refinement of prior audio identification technology. Like prior technology, it involves a full database search based on an audio segment.

Unlike prior technology, it accepts ambiguous identification from the audio segment and relies on the tracking mode 120 to resolve the ambiguity.

The identifying mode 110 includes receiving extracted fingerprints or audio features (submode 202), searching a database using the received input (submode 204), and updating tracking and writing caches based on the search results (submode 206). In submode 202, a portable device sends the server extracted fingerprint(s) or audio features from the segment. Alternatively, as described below, audio segments can be sent from the portable device to the server and features extracted there. Receiving submode 202 progresses to searching in submode 204, in which the server searches a database to identify an audio item or multiple candidate audio items within based on the segment. One slow but simple way to find the best match in a database of audio items is to use an exhaustive search across all possible items and time alignments, giving a similarity score to each. Additional techniques can then be used to decide when a match is good enough, and when ambiguous matches are present.

Upon identifying an audio item or multiple candidate audio items within the database, in submode 206 the server sends various data to cache(s). The data sent to the cache(s) includes audio item metadata and fingerprint or audio feature sequences for expected audio continuation(s). We refer to tracking and watching cache(s) in recognition that these caches could be separate physical or logical structures or could be combined into a single structure. The locations of metadata could be with or separate from the corresponding fingerprint or audio feature sequences. In submode 206, tracking and watching cache(s) are updated with additional fingerprints or audio features that are predicted to follow the extracted fingerprints or audio features.

The data sent to the tracking cache in submode 206 depends on degree of success in the search submode 204. The search submode 204 sometimes identifies a single audio item, so fingerprints or audio features for the tracking cache will relate to the one identified audio item. Sometimes the segment is too brief or noisy to reliably select among multiple candidates, so the data for the tracking cache will relate to multiple candidate items. Note that while the update cache submode 206 is only diagrammed as following from a successful search 204, it also results from a successful local recognition 244, described below.

The data sent to the watching cache typically includes more alternative fingerprint sequences than the tracking cache, because the next audio item is only related to the current audio item. That is, the next few notes of a song depend more on the last few notes than does the next song. The watching cache includes fingerprint or audio feature sequences of multiple future audio items predicted to follow a currently identified audio item.

Various techniques can be used to predict future audio items. For instance, in the case in which the audio items are songs, the predicted future audio items may be other songs in the same album as the identified song. Predicted future songs may be selected which have the same genre and/or artist as the identified song. As another example, predicted future songs may also be identified based on an observed sequence using previously identified sequences of songs in a multiplicity of audio files. Predicted future songs may also be identified based on playlists provided by various sources such as radio stations.

The tracking cache and the watching cache are collectively referred to as "predictive cache(s)", because the fingerprint or audio feature sequences are predicted to follow the received segment data that has been at least partially recognized in search submode 204 or local recognition submode 242, described below. From updating the cache(s), which is a server side function, we turn to the tracking mode 120, which can well be performed on a battery-powered portable device. In other embodiments, the tracking mode 120 may be a server-side function.

Tracking mode 120 is illustrated as having submodes of resolving ambiguities 222 and tracking transition from an identified audio item to a new item 224. The resolve ambiguities submode 222 only applies if the search 204 or local recognition 242 submode returns multiple candidates. This submode 222 can be bypassed when either the search 204 or local recognition 242 returns a single candidate. When there are multiple candidates, tracking is used to resolve ambiguities or to determine that none of the candidates match the audio signal being tracked. The candidates to be resolved can include different suspected alignments of the same audio item. For instance, from a segment of the chorus of a song, there may be several alternative alignments based on the different verses that may follow the chorus. Other ambiguities include remixes of songs, or parts of songs that sound similar, at least in the presence of noise. In practice, SoundHound has often been able to identify an audio signal without alignment information in under five seconds. Accordingly, the resolve ambiguities submode 222 may quickly transition to the track transitions submode 224.

Maintaining ambiguity has a computational cost, since every alternative is being tracked. During the tracking process, the system attempts to eliminate alternatives when possible. Since the number of candidates to be resolved during tracking is significantly less than the number of audio items in the full database during identification, the resolve ambiguities submode 222 may also be performed using less than the full bandwidth of fingerprints used during the identifying mode 110. Unless the user wants results immediately, the matching of alternatives may be performed as a background task, and the absence of low latency requirements allows the use of more efficient processing approaches.

Ideally, in the course of tracking, a single candidate will emerge rapidly from among the various candidates. The ambiguities are resolved by analyzing at additional data from the audio signal, such that many of the alternatives can be weeded out quickly.

The tracking mode 120 can be highly efficient and noise resistant for a number of reasons. First, it attempts to resolve the ambiguities using a handful of candidates, rather than millions. Second, during tracking, knowledge of the time alignment is approximately known. Searching for new alignments is computationally intensive, but a slight readjustment of alignment may be performed economically—for example to correct for small tempo mismatch. Also, due to the use of time stamps in captured data and time offsets in reference data, network latency does not result in timing ambiguity. Third, use of alignment data makes the tracking algorithm resilient to noise bursts. During a distracting burst (e.g., a truck passes by, or someone talking near the phone) no candidate will do well, and other systems might eliminate all candidates. With a little patience and alignment data, the tracking of one or more hypotheses can resume after a disconnect due to noise that lasts a fraction of a second or even a few seconds. Because items in the tracking cache remain available for a while and are time-stamped, the system can recover easily from a noise burst.

As soon as confirmation of a candidate item is achieved to the exclusion of others, ambiguity collapses. In practice, this is frequent; using more input usually drives choices quickly.

When all hypotheses are excluded, tracking fails and either watching or identifying mode kicks in.

When the ambiguities are resolved in the resolve ambiguities submode 222, the system transitions to the track transitions state 224. When tracking 120 fails or a transition has occurred, the system transitions to the watching mode 130. The watching mode 130 is illustrated as having submodes of attempting local recognition 242 and requesting updates 244. The watching process is similar to tracking, but in this case the alignment of the user audio against the reference audio is unknown. The watching mode 130 can well be performed on a battery-powered portable device. In other embodiments, the watching mode is a server-side function.

In submode 242, the system re-matches the fingerprints of all cached items in the watching cache with fingerprints of incoming audio, using new alignments. The items watched for can include those that were previously tracked, as well as others that may be sent by the server based on predictions of what the next audio item might be.

The watching cache can also include tracked items that have been automatically downgraded by the system from the tracking cache upon loss of alignment, such as may occur when jumping backward or forward in a song. The watched set of items also includes any other items that the server identifies as possible predictions, as discussed above. These possible predictions may be for example, the beginning of songs, or snippets of audio from ads of interest.

For instance, if the user listens to an audio track on a CD, the next track on the same CD can be tracked as an expected continuation, and an approximate alignment can be predicted at the juncture of two tracks. But if a user is listening in shuffle mode, all of the tracks on the CD can be equally predicted as possible continuations. It is sufficient to watch a small initial segment of these other tracks to notice the start of a new track, and resume the highly efficient tracking process. The user may also fast forward a playback device, or jump back in time, or repeat a song many times. To handle such cases, going back to the server for a fresh identification is still not needed at all, since the local cache(s) can be used.

The watching mode 130 may successfully identify an audio item from cached fingerprints or audio features, or it may fail. When the watching mode 130 fails, because the cached database does not include the extracted features or fingerprints from the current segment, the system transitions to the submode 200 of the identifying mode 110. When the watching mode 130 succeeds, updates to the predictive cache are requested 244, and the tracking mode 120 then resumes using the identified audio items of the cached fingerprints or audio items. At various times during tracking and watching, the predictive cache may be updated with additional fingerprints or audio features.

Tracking can be cheap. Watching is more expensive than tracking, due to searching for new alignments, but it is feasible for a reasonably small number of watched items, as long as processing and battery limitations of the device permit it.

Generally, tracking and watching are closely related. The middle region between known alignment and unconstrained alignment may include a continuum of predicted alignments. The entire matching activity, one input against locally cached items, is a continuum of constrained matching options, supported by sparsely sampled data, and usually much cheaper than a new identification search.

System Motivation

A system is described that can listen to audio captured by a portable, battery-powered device and automatically identify audio items, without significant user involvement, over a time period that exceeds the duration of a single item. This system may be seen as an efficient, somewhat generalized and more automated version of existing server-based music or audio identification systems. In a more traditional system, at a user's express request, the client transmits to a server a delimited query. The server matches the query against a large catalog of reference items, and returns information about the salient match or matches to the client. The purpose of the current system is broader. A Continuous Audio Matching (CAM) system as described herein supports the ongoing identification of client audio, over long periods of time, without requiring the user to take action on an ongoing basis.

There are a variety of scenarios in which passive and automatic matching of audio items during a continuous matching session can be preferable to a user. For example, the passive and automatic matching can be preferred in situations in which expressly issuing an audio query would break up an ongoing conversation and create awkward social dynamics, or would disrupt the user's enjoyment of the music. In some cases, it may also be simply too tedious and repetitive for the user to issue new queries repeatedly. Thus, the continuous monitoring and identification techniques described herein provide an entirely different user experience, in a variety of different ways.

For example, a user may bring the device along to a party or a dance club, and start a continuous matching session during which the device will simply listen to the ambient music. The user may then, after the party, obtain a list of the songs played during the evening. In another situation, the user may be watching movies, and be provided (right then or later) with information regarding when and where to acquire the corresponding DVD, or where to see the movie's sequel. In yet another scenario, the user can be watching broadcast programs, at home or at a friend's or anywhere else, and the system identifies which radio, TV or cable station was being watched during what time period, and what ads were heard. A user may be willing to receive incentives (financial or otherwise) in exchange for letting interested parties (ratings companies, stations, announcers and their agents) know what broadcast programs and what commercials the user was exposed to. The use of a motion sensor on the device can be used to confirm that an actual user was carrying the device, and it wasn't just left on a table near a TV or other audio source. Note that tracking also applies to broadcast sources, since they are synchronous, in which case broadcast fingerprints can be downloaded into the tracking cache, based on geographical area and other factors.

The resources utilized in performing the various tasks during a continuous matching session can be efficiently managed by the system, particularly to ensure that the battery life of the device is maximally preserved. This allows the system to perform its information gathering task, while leaving the device usable for other functions as well, even after a prolonged continuous matching session.

To help us realize the novelty of how the desired information can be collected using our new design, we next outline a collection strategy that ignores portable system efficiency concerns. Then, we will turn to methods that are efficient.

A Naïve Approach to Achieving the Core Functionality

One approach to an automated music identification system would be a tracking device with a dedicated communication channel (such as a DSL line) that repeatedly formulates and sends delimited queries to a server. Ignoring efficiency and user costs, one could obtain the desired logs by the repeated use of delimited queries, and some extra effort to summarize the delimited results.

In such a naïve system, delimited queries might be streamed repeatedly to the server by real time uploads, which would lead to a great deal of network traffic. If a network connection were not available or if scheduling were desired, delimited queries could be temporarily stored on the device, to be transmitted later. When a query is sent to the server, it is compared with catalog items. When matching items are found, information about them is sent back to the device. In a typical music or audio identification system, results are returned when the server has sufficient confidence about a match, but if there are several plausible candidates, only one is returned, which may turn out to be quite limiting.

This simple approach requires not only network accesses, but post-processing resources as well. As a result, use of a traditional delimited query identification system for continuous audio matching will cause inefficiency and unnecessary network traffic; batteries may drain rapidly, among other drawbacks. In the sections below, we focus on what a more optimized system.

A Better Continuous Audio Matching System

The simple approach above may be suited to some situations, but often can benefit from more efficient methods that are sensitive to costs, to context and to the user's configurations (preferences) and user scheduled or immediate requests. A better system might accomplish some or all of the following characteristics:

Automates the identification of items, without the user's help to define audio queries;
Allows users to interact with the system if they want to, for example, to review identified items;
Preserves battery life, allowing the automatic identification of items for as long as possible, while making sure that the device remains usable after an active session has ended;
Provides the user with some control over behaviors that affect costs (e.g., data usage charges);
Gives users control over settings to specify their wishes, or state assumptions about the environment;
Require as little action from the user as possible. For example, the system would return to its normal operation after an interruption, such as a phone call, or recovery, such as recharging the battery or the telephone credits, or the reopening of network communication options.

Organization of a Continuous Audio Matching System

The device may have volatile memory (RAM) and persistent memory (e.g., a hard disk), as well as one or more microphones, and one or more network interfaces. The device includes system components that specialize in the low-level handling of each of these components. The system is organized around a set of cooperating processes, which can be thought of as running in parallel, although in many cases they may be taking turns and waiting for one another. Even if the operation often becomes sequential, describing the various processes as parallel activities covers more implementation options.

In some embodiments, the tracking and watching cache(s) may be stored in a local cache on the portable battery-powered, portable device. In other embodiments, the tracking and watching cache(s) may be stored on a local cache in the server. In yet other embodiments, local caches in both the server and the client may be utilized, with the system dynamically selecting between the client-side cache and the server-side cache during operation. We now turn to the individual processes characteristic of a CAM system.

Figure 3:
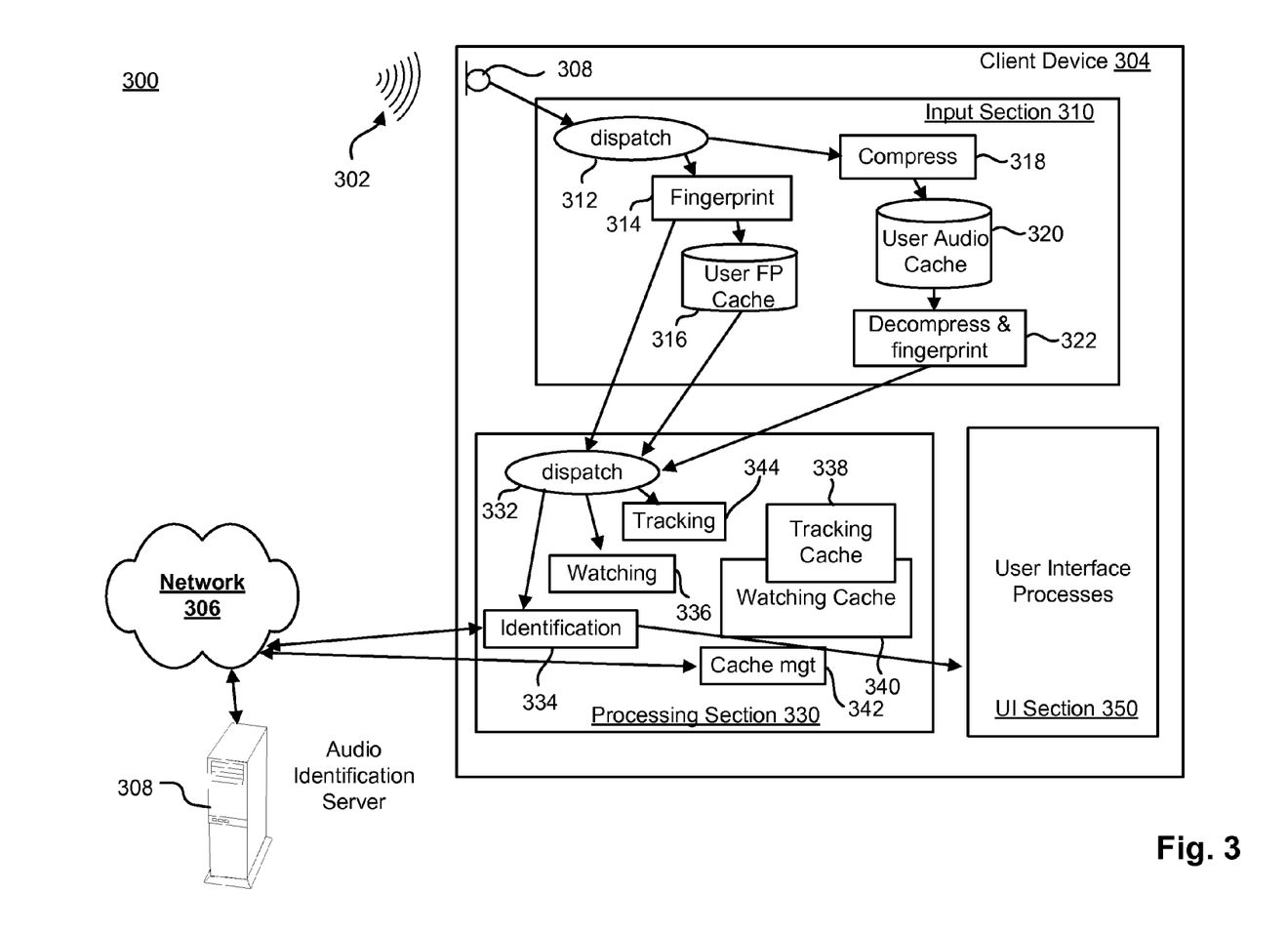
FIG. 3 is a block diagram of a system suitable to continuously monitor and identify audio items from a continuous audio monitoring signal.

FIG. 3 is a block diagram of a system 300 suitable to continuously monitor and identify audio items from a continuous audio monitoring signal. The system 300 includes a client device 304 which can be utilized to capture audio signals which can be identified in corporation with an audio identification server 308. The client device 304 may be a smart phone or other battery powered-portable device.

The system 300 also includes a communication network 306 that allows for communication between the various components of the system 300. Exemplary lines of communication are illustrated between various modules of FIG. 3, and in other figures herein. The lines of communication are not intended to limit which modules are communicatively coupled with others, nor are they intended to limit the number and type of signals communicated between modules.

The client device 304 includes memory for storage of data and software applications, a processor for accessing data and executing applications, and components that facilitate communication over the communication network 306. The client device 304 includes a microphone 308 to capture an audio signal from an audio source 302 in the surrounding environment. During a continuous audio matching session, the client device 304 operates in conjunction with the audio identification server 308 to continuously monitor and identify audio items within the captured audio signal using the techniques described herein. The client device 304 is described in more detail below.

The audio identification server 308 is a computing device tasked with storing or otherwise accessing a database for audio items and related data, to provide memory and processing for accessing the data and executing modules, and to support access to the communication network 306. In practice, the server 'device' typically consists of one or more data centers, each comprising many networked computers, multiple layers of servers from front-ends to back-ends, and using multifaceted load balancing strategies.

During identification, the audio identification server 308 is tasked with receiving extracted fingerprints or audio features from the device 304, searching a database using the received input, and updating tracking and watching caches 338, 340 on the client device 304 based on the search results. Upon identifying an audio item or multiple candidate audio items, the identification server 308 sends various data to the tracking and writing caches 338, 340. The data sent includes audio item metadata and fingerprint or audio feature sequences for expected audio continuation(s). The audio identification server 308 is also tasked with updating the tracking and watching caches 338, 340 with additional fingerprints or audio features at various times during the tracking and watching modes.

The client device 304 is illustrated as having an input section 310, a processing section 330, and a user interface (UI) section 350. The input section 310 receives the audio signal via the microphone 308, and process the audio signal. As described in more detail below, the processing performed by the input section 310 can include extraction, compression and recording processes.

The processing section 330 receives the processed results from the input section 310. The processing section 330 provides signals to control the resources of the device 300 and server 308, including network transmit and receive processes, to carry out the various operations during a continuous audio matching session. The operations include query/item identification, item tracking and item watching, cache maintenance, as well as some user interface components in UI section 350.

Input Section

A dispatch module 312 in the input section 310 receives the audio signal captured by the microphone 308. In embodiments in which more than one microphone is used to capture audio, the input section 310 may extract the audio of interest from the multi-channel input. This extraction may for example be performed by simply selecting one of the microphones, or may be a more elaborate de-mixing process.

The dispatch module 312 provides the audio signal to one or both of a fingerprint module 314 and a compression module 318. The fingerprint module 314 extracts fingerprints from segments of the incoming audio signal. The extracted fingerprints can be stored in a user fingerprint (FP) cache 316. The extracted fingerprints in the cache 316 can then be provided to the processing section 330, or may be provided directly from the fingerprint module 314.

The compression module 318 compresses the incoming audio signal. The compressed representation of the incoming audio is then stored to a local user audio cache 320. The compressed representation in the user audio cache 320 can subsequently be provided to a decompress & fingerprint module 322. The decompress & fingerprint module 322 compute fingerprints using the compressed representation of the audio signal. Note that fingerprints computed directly from uncompressed audio generally provide more accuracy for identification, as computing fingerprints after audio compression usually decreases quality.

In general, both the fingerprints and the compressed representation may be stored. In some cases, only the fingerprints may be needed if playback options are not needed. In other cases, only compressed data may be needed if fingerprint creation can be postponed. The fingerprinting of audio queries may be done server-side, or client-side, and in either case it may be delayed.

The computational load of fingerprinting also affects battery life of the client device 304. The fingerprinting can also affect the performance of the client device 304, such as if it is multi-tasking and the fingerprinting runs in background. The choice of a preferred mode or timing for fingerprint computation can depend on network bandwidth, the cost of computing locally, and other factors or requirements including preferences or explicit user requests.

When disk space is available on the client device 304, the compressed representation of the incoming audio stored in the user audio cache 320 may be frequently flushed to the disk. This may also occur if the audio is also immediately streamed to the server 308. All audio that enters the system may remain available for a while, for user review or for matching, until the system or the user releases the temporary audio storage.

Processing Section

A dispatch module 332 in the processing section 330 receives the analyzed results from the input section 310. The dispatch module 332 provides the analyzed results to a tracking module 344 tasked with item tracking during the tracking mode. The dispatch module 332 provides the analyzed results to a watching module 336 tasked with item watching during the watching mode. The dispatch module 332 provides the analyzed results to an identification module 334 tasked with item identification during the identifying mode.

A single network interface, or several, may be available to client device 304. Some interfaces are only available part of the time. Costs can differ for distinct network types, yet approximate costs may be predictable.

Modern mobile devices have access to multiple network types (e.g., Edge, 3G, WiFi, 4G, etc.). The properties of the networks differ in their impact on battery life, as well as with respect to bandwidth or to user cost. Some networks give a user unlimited access. Other networks may charge per use, or provide pre-paid allocations and then charge incrementally for going over. In addition, access to various networks may also be transient, based on both device location and on momentary availability.

The processing section 330 is tasked with managing network usage of the client device 304 among the available options. This management can be based on both battery life of the client device 304 and user costs.

This management may also be based on additional characteristics, such as whether the user requests early reviews of the list of songs identified. Without such a request, which can be expressed by user preference settings or explicit request, postponing identification until a later time can be a simple and cheap option, in the absence of specific reasons to process queries immediately.

On the other hand, when tracking a user's exposure to broadcast stations, use of 'real-time catalogs' by the audio identification server 308 can necessitate early transmission of the audio to the server 308 via the network 306.

In each situation, the processing section 330 can select a mode of operation according to an optimized tradeoff of costs and benefits, under the constraints of user preferences and the relevant context. Examples of automated behaviors carried out by the system may include the following.

Example 1

When it is expensive to transmit data, but processing power is available (e.g. no risk of draining the battery) fingerprinting is done on the client device 304. In some instances, a smaller fingerprint representation (and then, an intermittent subset of them) may be transmitted for matching to the audio identification server 308.

Example 2

If transmission is cheap for the user, but processing on the client device 304 would rapidly drain the battery, audio may be sent directly to the audio identification server 308, where it is converted to a fingerprint and matched.

Example 3

Same as example 2, but the transmission of audio can also drain the battery, even more than fingerprinting. As network usage charges are outweighed by power consumption, fingerprinting will be done on the client device 304, since that is less harmful to battery life than sending the larger amount of data.

Example 4

Overriding other rules, if the context requires low-latency audio processing, as when tracking broadcasts, and the costs are subsidized by a third party, audio will be sent directly to the audio identification server 308.

The processing section 330 includes a cache management module 342 which requests updates for and maintains the tracking cache 338 and the watching cache 340. Upon request, items enter either cache when the audio identification server 308 sends them to the client device 304.

As described above, the tracking cache 338 includes alignment information for references (if any) which the audio identification server 308 suggests as potential matches to an audio query—and their continuation through time. Other items enter the tracking cache 338 by way of an alignment match from the watching cache 340.

The tracking cache may also include 'real-time' segments from broadcast stations under observation (e.g. radio, TV or cable), in which case the data is time-stamped by the wall clock at the time of broadcast. Since the alignment is predictable by time-stamping a device's audio input (and the cached items as well) at the time of capture, an implied alignment is provided. This will apply equally in real-time or to the delayed processing of the audio signals.

The cache management module 342 creates a timed log of the items recognized in the audio, and can provide the user with a report via the UI section 350 based on that information. Other parties may also be authorized by the user of the client device 304 to gain access to selected portions of the information collected, which may be of some value.

The watching cache 340 includes tracked items that have been automatically downgraded by the cache management module from the tracking cache 338. As described above, this can occur for example in the case of a loss of alignment, such as when jumping backward or forward in a song. But the watched set of items in the watching cache 340 also includes any other items that the audio identification server 308 sends to the client device 304 as plausible predictions, as discussed above, for example, the beginning of songs, or snippets of audio from ads of interest.

The various processes described above are generally organized so that the minimum amount of work is done when resources are scarce, but work can be done more proactively if resources are present. Also, we note that tracking and watching may happen in real-time, in conjunction with the current audio, or in delayed mode—catching up with audio that was recorded earlier. Multiple instances of these processes may also be running concurrently, or taking turns under a scheduler's control.

The overall control flow generally includes the (real-time) input section, with a (sometimes optional) extraction, compression and recording activities, followed by tracking. As long as the system is tracking an identified reference, there is no need to start new identification. There may also be one or more previously recorded input streams, in which audio is processed in a delayed manner.

Whenever tracking fails, the processing section 330 turns to the watching of predicted items. If watching succeeds, tracking is resumed. These transitions between watching and tracking apply both to real-time tracking and to delayed tracking.

When tracking and watching both fail on the incoming audio (real-time or delayed), the system may rely on a classifier to look for evidence of music in the audio. If the right enabling conditions are met (music is heard, battery power is available, and a network may be used at reasonable user cost) the client device 304 can send a new delimited query to the audio identification server 308 for identification. Immediate communication may also be attempted after an explicit request from the user, who may request log results, or in modes (such as tracking broadcast stations) that are much more efficient when performed in real-time.

In the server's response, items (and alignments) are earmarked for tracking or for watching caches 338, 340, and the updates are sent to the cache management module 342, on an ongoing basis.

User Interface (UI) Section

The UI section 350 in the client device 304 allows for user control over context settings which utilize the user's knowledge of the musical environment, or of user identification goals, such as whether short segments are expected (vs. songs of full duration) and whether short segments should be identified. The processing section 330 may assume that song segments will usually play for at least one minute, by default, unless a user setting indicates otherwise. It can also check that matching is economical, and promptly re-attempt identification after matching fails, if certain conditions hold (e.g. battery, cost, etc.). The UI section 330 allows the user to optionally control tradeoffs between a lower cost for processing and a higher likelihood of detecting items. For example, a user may know whether a new audio item is likely to be played before the current item finishes.

One of the options available to the system is to place targeted ads, related to the audio content that the user is experiencing. This is another capability that is achieved through cooperation between the server 308 and UI capabilities on the device 304.

Users have a say in the life span of the audio recordings, and like to review recent audio. In such a case, the device 304 can also acts as a personal recorder. Functions may also be provided that add value to the automatically made recordings. These functions can include replay, processing, editing and the ability to share. A graphical user interface (GUI) provided by the UI section 350 gives convenient access to recent audio and may receive system support and pass it on to other apps.

Another option that may be provided via the UI section 350 is to provide live lyrics for any song that has been recognized, while it is being tracked. This may be a mode that is selectable by the user. Additional options include power-saving techniques such as auto-dimming of the screen while the system runs in background.

Figure 4:
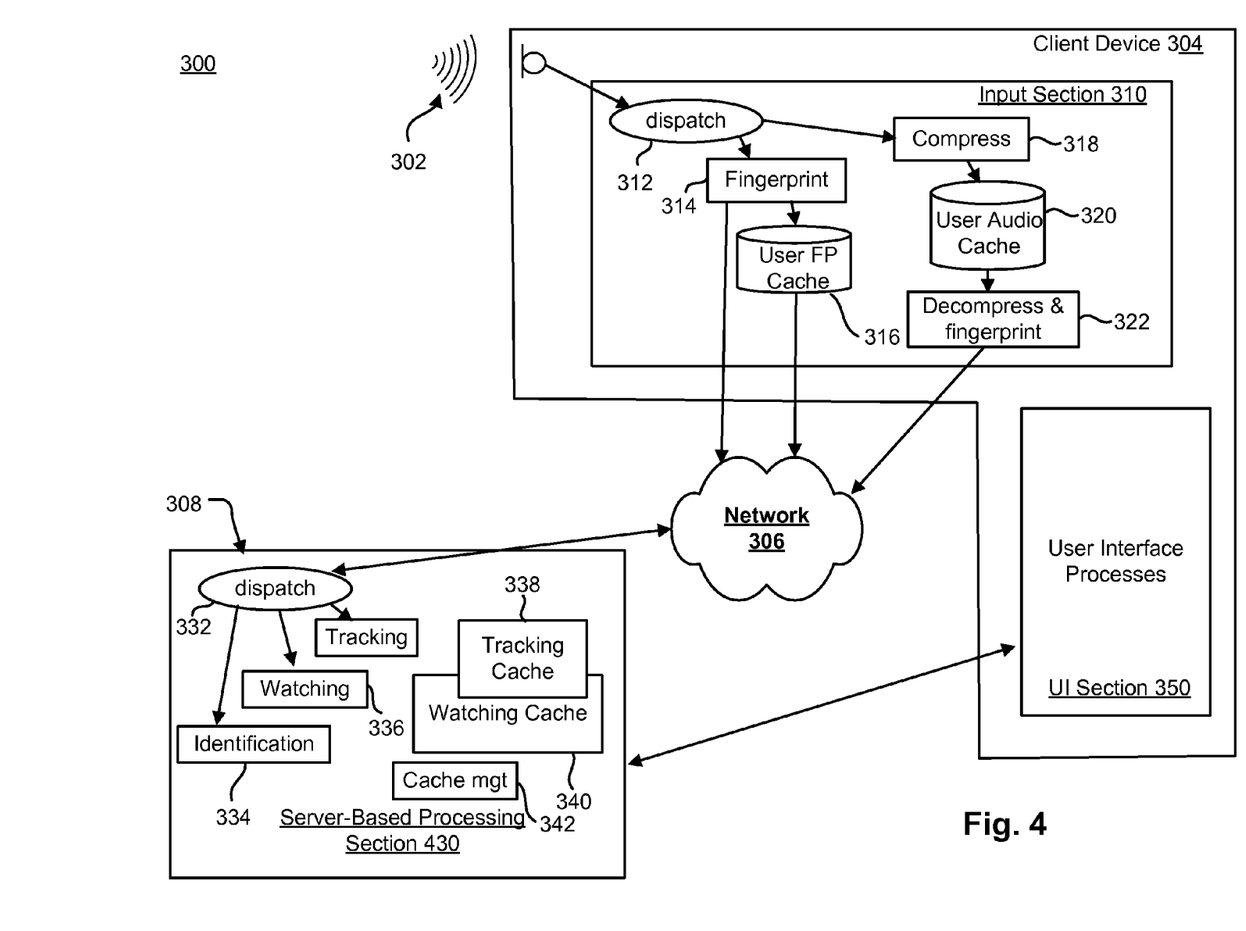
FIG. 4 is a block diagram of a second system suitable to continuously monitor and identify audio items from a continuous audio monitoring signal.

In the system 300 illustrated in FIG. 3, the updating tracking and watching caches 338, 340 are in the client device 304. FIG. 4 is a block diagram of a second system 400 suitable to continuously monitor and identify audio items from a continuous audio monitoring signal. The system 400 differs from the system 300 in that the watching cache 338 and the tracking cache are 340 are server-side caches within a server-based processing section 430. The operations performed by the various modules within the server-based processing section 430 are similar to the modules described above in connection with the device-based processing section 330.

Particular Embodiments

The technology disclosed can be practiced as a method, device or article of manufacture directed to continuously monitoring an audio signal and identifying audio items within the audio signal. The method, device and article of manufacture are computer oriented, not for execution using pen and paper.

In one aspect of the technology, a method described herein includes using a battery powered device to continuously monitor an audio signal and identify audio items within the audio signal. The method includes predictively caching of audio fingerprint sequences and corresponding audio item identifiers from a server after the device sends initial audio fingerprints extracted from the audio signal by the device.

The method can further include where the predictively cached audio fingerprint sequences include audio fingerprint sequences of future audio items predicted to follow the initial fingerprints. The method can further include where the predictively cached audio fingerprint sequences include the predictively cached audio fingerprint sequences of potentially identified songs that share the initial fingerprints. The method can further include where the identified audio item is a song.

The method can further include where the cached fingerprint sequences are stored in a local cache on the device. The method can further include where the cached fingerprint sequences are stored in a local cache on the server.

The method can further include receiving additional predictively cached audio fingerprint sequences upon to identification of the audio item within the audio signal. The method can further include using the predictively cached audio fingerprint sequences to identify another audio item within the audio signal without intervention by a user. The method can further including maintaining a timed log of identified audio items within the audio signal.

In another aspect of the technology, a method described herein includes efficiently using a battery powered device to continuously monitor an audio signal and identify audio items within the audio signal. The method includes receiving into a local cache on the device predictive audio fingerprints and corresponding audio item identifiers appropriate to a watching mode and a tracking mode as the device switches between the watching and tracking modes. The method also includes switching between the watching mode in which a transition has occurred between a known audio item and a new unknown audio item, and the tracking mode in which a plurality of candidates for a current audio item have been identified, but not resolved to a single current audio item.

The switching can further includes switching between the watching mode, the tracking mode and an identifying mode in which the device relies upon a sever to act upon fingerprints sent from the device which cannot be resolved using the predictively cached audio fingerprints.

The method can further include receiving into the local cache updated predictive audio fingerprints and corresponding updated audio item identifiers upon a successful identification of one or more audio items for the fingerprints which were not resolved using the predictively cached audio fingerprints.

The tracking mode can further include resolving the single current audio item from among the plurality of candidates. The method can further include where the switching between the watching mode and the tracking mode occurs without intervention by a user. The method can further include switching from the watching mode to the tracking mode upon a determination one or more of the plurality of candidates match the current audio item.

In another aspect of the technology, a method described herein includes managing resources in a server to continuously monitor an audio signal and identify audio items within the audio signal. The method includes receiving into a local cache on the server predictive audio fingerprints and corresponding audio item identifiers appropriate to a watching mode and a tracking mode as the server switches between the watching and tracking modes. The method includes switching between the watching mode in which a transition has occurred between a known audio item and a new unknown audio item, and the tracking mode in which a plurality of candidates for a current audio item have been identified, but not resolved to a single current audio item.

The switching can further include switching between the watching mode, the tracking mode and an identifying mode in which the server acts upon additional fingerprints of the audio signal which cannot be resolved using the predictively cached audio fingerprints.

The method can further include receiving into the local cache updated predictive audio fingerprints and corresponding updated audio item identifiers upon a successful identification of one or more audio items for the fingerprints which were not resolved using the predictively cached audio fingerprints.

The tracking mode can further include resolving the single current audio item from among the plurality of candidates. The method can further include where the switching between the watching mode and the tracking mode occurs without intervention by a user. The method can further include switching from the watching mode to the tracking mode upon a determination that one or more of the plurality of candidates match the current audio item.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods to continuously monitor an audio signal and identify audio items within the audio signal, systems including logic and resources to continuously monitor an audio signal and identify audio items within the audio signal, systems that take advantage of computer-assisted methods to continuously monitor an audio signal and identify audio items within the audio signal, media impressed with logic to continuously monitor an audio signal and identify audio items within the audio signal, data streams impressed with logic to continuously monitor an audio signal and identify audio items within the audio signal, or computer-accessible services that carry out computer-assisted methods to continuously monitor an audio signal and identify audio items within the audio signal. It is contemplated that modifications and combinations will readily occur to those skilled in the art, which modifications and combinations will be within the spirit of the invention and the scope of the following claims.

What is claimed is:

1. A method of using a battery powered device to monitor an audio signal and identify audio items within the audio signal, the method including:
   responsive to the battery powered device having sent initial audio fingerprints extracted from the audio signal, identifying an initial audio item in the initial audio fingerprints;
   responsive to identifying the initial audio item, updating a cache from a server with one or more audio fingerprint sequences from one or more audio items that are predicted to follow the identified initial audio item, and updating the cache with respective audio item identifiers for the one or more audio items; and
   matching additional audio fingerprints extracted from the audio signal to the cached audio fingerprint sequences, of the one or more audio items predicted to follow the identified initial audio item, to identify an audio item within the audio signal as one of the one or more audio items.

2. The method of claim 1 wherein the one or more audio items are predicted to follow the identified initial audio item based on an observed sequence using previously identified sequences of songs in a multiplicity of audio items.

3. The method of claim 1, where the one or more audio fingerprint sequences from one or more audio items are stored in a local cache on the battery powered device.

4. The method of claim 1, wherein the one or more audio fingerprint sequences from one or more audio items are stored in a local cache on the server.

5. The method of claim 2, wherein the identified initial audio item is a first song, and the one or more audio items that are predicted to follow the identified initial audio item are one or more songs on the same album as the first song.

6. The method of claim 2, wherein the identified initial audio item is a first song, and the one or more audio items that are predicted to follow the identified initial audio item are one or more songs on a known playlist including the first song.

7. A method of efficiently using a battery powered device to continuously monitor an audio signal and identify audio items within the audio signal, the method including:
receiving into a local cache on the battery powered device predictive audio fingerprints and corresponding audio item identifiers appropriate to a tracking mode; wherein the tracking mode includes a known or suspected alignment of at least one fingerprint extracted from the audio signal with at least one reference fingerprint, and the predictive audio fingerprints for the tracking mode are sequences of fingerprints relative to the known or suspected alignment that represent multiple candidate audio items for a single current audio item.

8. The method of claim 7, wherein the tracking mode includes resolving the single current audio item from among the multiple candidate audio items.

9. The method of claim 7, further including:
receiving into the local cache on the battery powered device predictive audio fingerprints and corresponding audio item identifiers appropriate to a watching mode as the device switches between the tracking and watching modes, wherein the watching mode is invoked from the tracking mode when an end of an audio item is detected or a user skips past the end of the audio item, and the predictive audio fingerprints for the watching mode are sequences of fingerprints that represent other audio items predicted as likely to follow an identified audio item; and
switching between the watching mode in which a transition has occurred between the identified audio item and the single current audio item, and the tracking mode in which the multiple candidate audio items for the single current audio item have been determined, but ambiguities have not been resolved to identify the single current audio item.

10. The method of claim 9, wherein the switching includes switching between the watching mode, the tracking mode and an identifying mode in which the battery powered device relies upon a server to act upon fingerprints sent from the battery powered device which cannot be resolved using the predictive audio fingerprints.

11. The method of claim 9, including switching from the watching mode to the tracking mode upon a determination one or more of the multiple candidate audio items match the single current audio item.

12. The method of claim 10, including receiving into the local cache updated predictive audio fingerprints and corresponding updated audio item identifiers upon a successful identification of one or more audio items for the fingerprints which were not resolved using the predictive audio fingerprints.

13. A method of managing resources in a server to continuously monitor an audio signal and identify audio items within the audio signal, the method including:
receiving into a local cache on the server predictive audio fingerprints and corresponding audio item identifiers appropriate to a tracking mode; wherein the tracking mode includes a known or suspected alignment of at least one fingerprint extracted from the audio signal with at least one reference fingerprint, and the predictive audio fingerprints for the tracking mode are sequences of fingerprints relative to the known or suspected alignment that represent multiple candidate audio items for a single current audio item.

14. The method of claim 13, wherein the tracking mode includes resolving the single current audio item from among the multiple candidate audio items.

15. The method of claim 13, further including:
receiving into the local cache on the server predictive audio fingerprints and corresponding audio item identifiers appropriate to a watching mode as the server switches between the tracking and watching modes, wherein the watching mode is invoked from the tracking mode when an end of an audio item is detected or a user skips past the end of the audio item, and the predictive audio fingerprints for the watching mode are sequences of fingerprints that represent other audio items predicted as likely to follow an identified audio item; and
switching between the watching mode in which a transition has occurred between the identified audio item and the single current audio item, and the tracking mode in which the multiple candidate audio items for the single current audio item have been determined, but ambiguities have not been resolved to identify the single current audio item.

16. The method of claim 15, wherein the switching includes switching between the watching mode, the tracking mode and an identifying mode in which the server acts upon additional fingerprints of the audio signal which cannot be resolved using the predictive audio fingerprints.

17. The method of claim 15, including switching from the watching mode to the tracking mode upon a determination that one or more of the multiple candidate audio items match the single current audio item.

18. The method of claim 16, including receiving into the local cache updated predictive audio fingerprints and corresponding updated audio item identifiers upon a successful identification of one or more audio items for the fingerprints which were not resolved using the predictive audio fingerprints.

19. A method of using a battery powered device to efficiently monitor an audio signal and identify audio items that match the audio signal, the method including:
responsive to the battery powered device having sent initial audio fingerprints extracted from the audio signal corresponding to an initial audio item, identifying one or more candidate audio items including fingerprints matching the initial audio fingerprints extracted from the audio signal;
updating a first cache from a server with a plurality of audio fingerprint sequences from the one or more candidate audio items and updating the first cache with respective audio item identifiers for the one or more candidate audio items; and
matching one or more additional audio fingerprints, extracted from the audio signal after the initial audio fingerprints, to the audio fingerprint sequences of the one or more candidate audio items in the first cache to identify the initial audio item as one of the one or more candidate audio items.

20. The method of claim 19, wherein the initial audio item is a song; and
wherein the one or more candidate audio items include different mixes of the song.

21. The method of claim 19, where the first cache is stored on the battery powered device.

22. The method of claim 19, where the first cache is stored on the server.

23. The method of claim 19, wherein matching the one or more additional audio fingerprints to the cached audio fingerprint sequences includes computing first alignments of the additional audio fingerprints with the one or more candidate audio items.

24. The method of claim 19, further including:
in response to identifying the one or more candidate audio items, identifying one or more additional candidate audio items that are predicted to follow the one or more candidate audio items;
updating a second cache from the server with a plurality of audio fingerprint sequences from the one or more additional candidate audio items and updating the second cache with respective audio item identifiers for the one or more additional candidate audio items; and
matching the one or more additional audio fingerprints to the audio fingerprint sequences of the one or more additional candidate audio items in the second cache to identify a second audio item, in the audio signal after the initial audio item, as one of the one or more additional candidate audio items.

25. The method of claim 23, further comprising adjusting the first alignments of the additional audio fingerprints with the one or more candidate audio items.

26. The method of claim 23, further comprising attempting to maintain the computed first alignments, and
wherein if the attempt to maintain the computed alignment fails, computing second alignments of the additional audio fingerprints with the one or more candidate audio items, different from the first alignments.

27. The method of claim 24, wherein one or more additional candidate audio items are predicted to follow the one or more candidate audio items based on previously identified sequences of songs in a multiplicity of audio items.

28. The method of claim 27, wherein the first audio item is a first song, and the additional candidate audio items are songs on a known playlist including the first song.

29. The method of claim 27, wherein the first audio item is a first song, and the additional candidate audio items are songs on the same album as the first song.

30. A method of using a battery powered device to efficiently monitor an audio signal and identify audio items that match the audio signal, the method including:
responsive to the battery powered device having sent initial audio fingerprints extracted from the audio signal corresponding to an initial audio item, identifying one or more candidate audio items including fingerprints matching the initial audio fingerprints extracted from the audio signal;
updating a first cache from a server with a plurality of audio fingerprint sequences from the one or more candidate audio items and updating the first cache with respective audio item identifiers for the one or more candidate audio items;
in response to identifying the one or more candidate audio items, identifying one or more additional candidate audio items that are predicted to follow the one or more candidate audio items;
updating a second cache from the server with a plurality of audio fingerprint sequences from the one or more additional candidate audio items and updating the second cache with respective audio item identifiers for the one or more additional candidate audio items; and
matching one or more additional audio fingerprints, extracted from the audio signal after the initial audio fingerprints, to the audio fingerprint sequences of the one or more additional candidate audio items in the second cache to identify a second audio item, in the audio signal after the initial audio item, as one of the one or more additional candidate audio items.

* * * * *